G. H. BOLDUC.
CAR FENDER.
APPLICATION FILED FEB. 21, 1914.

1,128,577.

Patented Feb. 16, 1915.

WITNESSES:
Chas. J. Fitzsimons
M. E. Broesamle

INVENTOR
George H. Bolduc
B. F. Wheeler
ATTORNEY

UNITED STATES PATENT OFFICE.

GEORGE H. BOLDUC, OF DETROIT, MICHIGAN.

CAR-FENDER.

1,128,577. Specification of Letters Patent. Patented Feb. 16, 1915.

Application filed February 21, 1914. Serial No. 820,102.

*To all whom it may concern:*

Be it known that I, GEORGE H. BOLDUC, a citizen of the Dominion of Canada, residing at Detroit, in the county of Wayne, State of Michigan, United States of America, have invented certain new and useful Improvements in Car-Fenders; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to car fenders especially adapted for use upon street and interurban railway cars, and consists in the construction and arrangement of parts as hereinafter more fully set forth and pointed out particularly in the claims.

The primary object of the invention is to provide, in connection with a fender adapted to be automatically actuated by contact, means for so mounting and supporting the fender as to retain the forward end of said fender at a fixed or given distance from the surface of the rails of the track notwithstanding the variations of the distance of the body of the car to the rails, occasioned by the action of the springs of the car, wherein the construction and arrangement is such as to effect a compensation for the vertical movement of the car and to neutralize the movement of the fender therewith at its forward end.

A further object of the invention is to provide means for manually actuating the fender to enable the motorman of the car to drop the forward end of said fender upon the rails of the track to prevent the passage of an object thereunder, and also to enable the body of the fender to be raised when it is desired to increase the clearance between said fender and the rails of the track.

Figure 1:
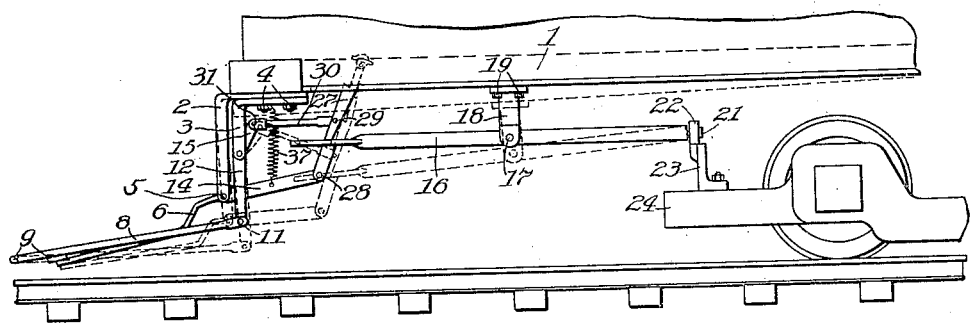
Figure 2:
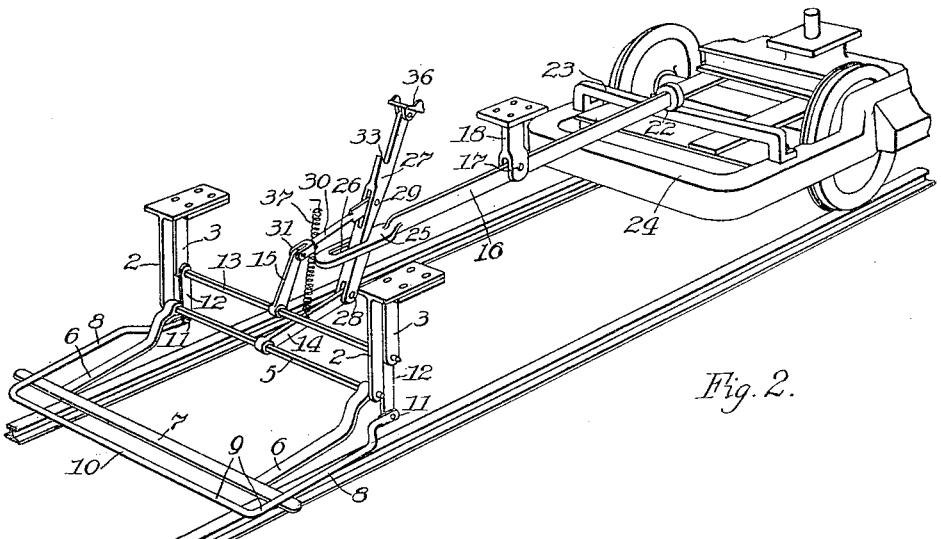
Figure 3:
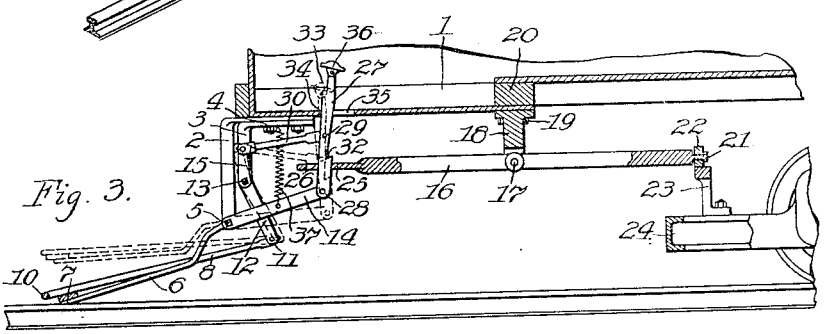

The above objects are attained by the employment of the construction and arrangement of parts as illustrated in the accompanying drawings, in which:

Figure 1 is a side elevation of the front portion of a car showing the improved fender attached thereto in position for operation, and indicating by dotted lines the relative vertical movement of the car and fender with respect to the rails of the track as motion is imparted to the car through the action of the springs upon which the body of the car is mounted, incident to the variations in the load on the car and the uneven surface of the rails. Fig. 2 is a perspective view of the fender, its connecting parts, and a portion of the truck detached from the body of the car, the parts of the fender being set as in their normal position. Fig. 3 is a vertical longitudinal section through the front portion of the car and fender, showing the parts of the fender in the operated position with the forward end resting on the rails, and indicating by dotted lines the raised position of the fender to increase the clearance with the rails of the track.

Referring to the drawings by the characters of reference marked thereon, 1 designates the sills or side rails of the body of the car from which the fender is carried. Depending from the forward end of the body of the car, upon opposite sides thereof, are hangers 2 and 3, which are secured together at their upper ends and to the ends of the side rails 1 by means of bolts and nuts, as at 4. The frame of the fender is supported upon a rock shaft 5 which is journaled at its ends in the lower ends of the hangers 2, and secured rigidly at their upwardly curved ends to said rock shaft 5, between the hangers 2 thereof, are rails 6 which form the side rails of the fender, and which extend forwardly at an incline from said rock shaft. Extending across and connecting the forward ends of the side rails 6 is a cross rail 7, the ends of which project beyond said side rails and serve as a support for the side members 8 of a slidable trip yoke 9, the forward cross connecting member 10 of which lies in advance of and parallel with the cross rail 7 of the fender. The rearwardly projecting ends of said yoke are pivotally connected at 11 to the lower ends of downwardly extending crank arms 12, which arms at their upper ends are connected rigidly to a rock shaft 13, which in turn is journaled at its ends in the lower ends of the hangers 3 of the frame of the car.

Attached rigidly and centrally to the rock shaft 5 is a crank arm 14 which extends rearwardly therefrom in the plane of the side rails of the fenders, by means of which motion is imparted to said rock shaft to swing said fender upon its pivotal connection with the hangers 2. Extending upwardly at an incline and rigidly attached centrally to the rock shaft 13 is a crank arm 15, to which motion is imparted through said rock shaft by the sliding engagement of the trip yoke 9 with the crank arms 12 of said shaft, whereby the mechanism for holding the forward end of the fender suspended above the rails of the track may be released or tripped by a sliding movement of said yoke through contact with an object upon the track, to cause the forward end of said fender to drop upon the rails, as hereinafter more fully described.

It should be understood that the frame of the fender, will in practice, be provided with a suitable screen or covering of network to form the body of the fender and provide a yielding support for the reception of objects that may fall thereon, this feature having been omitted from the drawing to avoid confusion with the more essential features of construction.

As a means of locking the actuating parts to hold the forward end of the fender suspended at a fixed distance above the rails in a manner not to be affected or varied by the vertical movement of the body of the car, a horizontal bar in the form of a lever 16 is disposed beneath the body of the car and pivoted centrally, as at 17, within a forked hanger 18, which is secured at its upper end by bolts, as at 19, to a cross member 20 of the frame of the car from which is depends. The rear end of the lever 16 is provided with a journal bearing 21 upon which a roller 22 is journaled to rotate, and which is seated to bear in the form of a fulcrum upon a raised bracket 23 rigidly mounted upon the farme 24 of the truck of the car. The forward end of the lever 16 is provided with a flattened terminal portion 25 through which is formed an elongated aperture 26. Extending vertically through the aperture 26 of the lever 16 is a locking and releasing leaver 27, the lower bifurcated end of which is pivotally connected at 28 to the free end of the crank arm 14 of the fender. The body portion of said locking lever is pivotally connected at 29 to one end of a connecting rod 30, which, at its opposite end, is pivotally connected at 31 to the free end of the crank arm 15 of the rock shaft 13 of the sliding yoke 10, as clearly shown in Fig. 2.

The locking lever 27 is provided in its rear edge, at a point midway between its points of pivotal connection with the crank arm 14 of the fender and the connecting rod 30, with a notch forming a shoulder 32 for engagement with the under side of the flattened portion of the lever 16 at the inner end of the slotted aperture 26 therein, through the engagement of which the forward end of the fender is held at a point above the surface of the rails, and the forward end of the slidable trip yoke is held extended beyond the forward end of the fender, which is the normal position of the parts when set for operation as indicated in full lines in Fig. 1.

Formed in the forward edge of the locking lever 27, at a point near the upper end thereof, is a notch forming a shoulder 33, adapted for engagment with the platform 34 at the forward edge of an aperture 35 formed therein, through which said lever passes. Pivotally attached to the upper end of said locking lever is a foot rest 36, by means of which said lever may be depressed to bring the shoulder 33 thereon into a locked engagement with the platform 34 when the motorman is desirous of swinging the body of the fender upon its pivotal support to increase the clearance of said fender with the rails of the track, as indicated by dotted lines in Fig. 3. As a means of holding the shoulders of the locking lever in contact with their respective engaging members when said lever is set in either of the locked positions shown in Figs. 1 and 2, a coiled spring 37, attached at its lower end to the crank arm 14 and at its upper end to the body of the car, is employed for applying an upward tension upon said locking lever to hold its shoulders against disengagement that might be caused by jar or vibrations imparted to the body of the car, as clearly shown in Figs. 1 and 3.

The parts being set in their normal positions as shown in Fig. 1, the operation of the device will be as follows: The body of the fender being mounted to swing in the arc of a circle upon the rock shaft 5, its forward end will be held suspended at a suitable distance above the rails of the track when the locking lever connected with the crank arm of the fender is locked in engagement with the forward end of the horizontal lever pivotally carried by the body of the car, and fulcrumed at its rear end upon the frame of the truck. By this arrangement, as vertical movement is imparted to the body of the car through the action of the springs, said movement will be neutralized at the outermost end of the fender through the action of the lever 16, which, swinging upon its bracket or fulcrum support 23 will be caused to travel a greater distance at its forward end than the distance of travel of the forward end of the car, and in so doing will impart a rocking movement to the fender through the crank arm and locking lever connections, which will tend to raise the forward end of said fender at a ratio approximately equal to its downward movement with the body of the car, thus neutralizing such downward movement and thereby retaining the forward end of said fender in its fixed position with relation to the surface of the rails, as indicated by dotted lines in Fig. 1. The tripping yoke, which is carried upon and extends beyond the forward edge of the fender, upon receiving the impact of an object encountered upon the tracks, will be caused to slide rearwardly and actuate the crank arms of the rock shaft 13, causing the crank arm 15 thereon to swing forwardly, and through the connecting rod 30 carry with it the locking lever 27, which swinging upon its pivot, with the crank arm 14 of the fender, will disengage its locking shoulder 32 from contact with the lever 16, thereby releasing the support of the fender and causing the forward end of said fender to fall upon the rails of the track, as shown in Fig. 3, in which position the forward end of the fender will prevent the object encountered from passing thereunder, as will be readily understood.

To restore the parts to their normal position, the locking lever may be depressed by the foot of the motorman to bring the locking shoulder 32 into engagement with the under face of the lever 16, when the parts will again be in position for operation, as shown in Fig. 1. When desirous of raising the entire body of the fender upon its pivotal connection to increase the clearance between said fender and the rails of the track, or to enable the fender to pass over an obstruction upon the track, the locking lever may be depressed to engage its shoulder 33 with the platform of the car, when the body of the fender will be swung into a raised horizontal position as indicated by dotted lines in Fig. 3.

The purpose of the roller 22, upon the end of the lever 16, which engages with the raised support 23 of the truck of the car, is to provide for lateral movement between the body of the car and the truck as the truck is caused to turn upon its pivotal bearing with the frame of the car when rounding curves in the track or switching onto siding when the fender is applied to cars with double trucks. The roller may be dispensed with on single truck cars, and the end of the lever supported directly upon the truck support, as it is unnecessary to provide for lateral movement in single truck cars.

Having thus fully set forth my invention, what I claim as new, and desire to secure by Letters Patent, is:—

1. A car fender comprising a fender frame mounted on a rock shaft journaled upon hangers provided on the frame of a car and having a crank arm thereon, a yoke mounted to slide upon the frame of said fender, a rock shaft having a crank arm thereon journaled upon the said hangers secured to the frame of the car and having arms pivotally connected to the ends of said slidable yoke, a locking and releasing lever adapted for engagement with the platform of the car pivotally connected to the said crank arm of said fender frame and having a linked connection with the crank arm of the rock shaft connected with said slidable yoke.

2. A car fender comprising a fender frame pivoted on hangers secured to the frame of a car, a yoke slidably mounted upon the frame of said fender, a rock shaft journaled upon the said hangers provided on the frame of the car and having pivotal connection with said slidable yoke, a lever pivoted to the body of said car and having a fulcrumed bearing at one end upon the truck frame of the car, a locking and releasing lever adapted to engage the free end of said fulcrumed lever and having a pivotal connection with said fender frame and a linked connection with the rock shaft connected with said slidable yoke.

3. A car fender comprising a fender frame pivoted at its rear end on hangers secured to the frame of a car and having a crank arm thereon, a lever pivoted to the body of the car and having a fulcrum bearing at one end upon the truck frame of the car, a locking and releasing lever pivotally connected at its lower end to the crank arm of said fender frame and having a shoulder in the body thereof adapted to detachably engage the free end of said pivoted lever, whereby the forward end of said fender frame is supported and may be dropped upon the track by the disengagement of said locking lever with said pivoted lever.

4. In combination with the body and truck frame of a car, a fender comprising a hinged frame having a portion extending rearwardly of its hinged support, a lever pivoted to said car frame and having a bearing at one end upon the frame of the truck of the car and detachably connected at its opposite end with the rearwardly extending portion of said fender, whereby the forward end of said fender is supported so as to neutralize the vertical movement of the body of the car thereon and permit said fender, while the car is moving, to be dropped through disengagement of the detachable connection with said lever by the motorman.

5. In combination with the body and truck frame of a car, a fender frame journaled at its rear end upon hangers secured to the frame of said car and having an arm extending rearwardly therefrom, a rock shaft journaled on said car frame and having a central crank arm and end crank arms extending therefrom, a yoke mounted to slide on said fender frame and having its rear ends pivotally connected with the end crank arms of said rock shaft, a lever pivotally supported upon the frame of said car and bearing at its rear end upon the frame of said truck, the forward end of said lever having an aperture therein, a locking and releasing lever having a shoulder adapted to engage within the aperture of said pivoted lever and pivoted at its lower end to the arm of said fender frame, a connecting rod pivotally attached at one end to the body of said locking lever and at its opposite end to 5 the central crank arm of said rock shaft, whereby the forward end of said fender frame is supported to neutralize vertical movement of the car therewith and to be automatically dropped through movement imparted to the sliding yoke by contact therewith.

In testimony whereof, I sign this specification in the presence of two witnesses.

GEORGE H. BOLDUC.

Witnesses:
B. F. WHEELER,
M. E. BROESAMLE.

Copies of this patent may be obtained for five cents each, by addressing the "Commissioner of Patents, Washington, D. C."